UNITED STATES PATENT OFFICE 2,048,932

COATING FOR CONCRETE

Andrew Hartvedt, Kansas City, Mo.

No Drawing. Application September 7, 1935,
Serial No. 39,628

1 Claim. (Cl. 134—78.5)

This invention relates to a composition of matter in the nature of a coating compound for cement blocks, walls, articles of manufacture and cement structures, and the primary object of the invention is the provision of such a composition, the solidified form of which creates an effective coating for cement which renders it substantially waterproof, fills the pores at the surface to prevent disintegration by weathering and adds thereto a decorative and smooth surface which will otherwise protect and prolong the life of the mass so coated.

It is well known in this art that ordinary cementitious or concrete structures, when created in forms without troweling or otherwise smoothing, has a very porous outer surface that is conducive to crumbling as a result of action of the elements, and it is an aim of this invention to provide a generally protective coating for cement that may be applied either by spray gun or brush, that is inexpensive to manufacture and apply, that is hard and durable, and which has substantially the same coefficient of expansion and contraction as ordinary cement structures of commercial type containing Portland cement, sand, gravel and other analogous elements.

Many minor objects and advantages of this invention which is hereinafter described, will be obvious to those skilled in the art and the invention consists in the novel composition and method of manufacture herein set down and specifically pointed out in the claims.

The wet composition of which the solidified coating is a product, consists of Portland cement, sodium phosphate ($Na_2HPO_4$), calcium chloride ($CaCl_2$), and enough water to render the composition applicable as a liquid, and the proportions of said aforementioned ingredients are substantially as follows:

| | Pounds |
|---|---|
| Portland cement | 100 |
| Sodium phosphate | 4 |
| Calcium chloride | 6 |

In addition to the basic group of ingredients just set down, three to four pounds of ordinary salt or sodium chloride (NaCl) may be added as a further ingredient to render the hardened coating plastic enough to overcome the tendency to crack or fracture.

In addition to the group of basic ingredients, either with or without the sodium chloride, there may be added coloring material such as graphite, copper oxide, Venetian red, yellow ocher, etc., and when the coating is laid over "green" concrete, a considerable bit of glaze is produced as a character of the solidified coating.

It has also been found that pulverized or crushed marble may be added to the mixture including the basic ingredients to serve as an additional coloring medium and also as a body builder to supplement a part of the Portland cement. Crushed or pulverized rock of any desirable nature, sand or a similar body-making material may be added in the proportions found necessary to create desired consistency.

In actually mixing the composition of matter, the sodium phosphate, calcium chloride and sodium chloride, if used, is first dissolved in enough warm water to thoroughly liquefy the entire mass. After the Portland cement is mixed with enough water to make it a consistency of paste or liquid, then the dissolved chemicals mentioned are added, as is such coloring matter desired.

After the mixture is thoroughly stirred and made ready for use, it should be allowed to stand for from fifteen to thirty minutes to allow it to cool and then when ready to apply, the area to receive the coating should be thoroughly moistened so that proper bond between the coating and foundation mass may be established.

The quantities of the ingredients used in this composition of matter may vary somewhat, but compounding them in the proportions recited produces very good results.

What is claimed as new and desired to be secured by Letters Patent is:

A composition for making a coating for cement consisting of Portland cement; sodium phosphate; calcium chloride; and water, in approximately the proportions of 100 pounds of cement, 4 pounds sodium phosphate, 6 pounds calcium chloride in enough water to render the composition applicable as a liquid.

ANDREW HARTVEDT.